US012597379B2

(12) United States Patent
Zhou et al.

(10) Patent No.: US 12,597,379 B2
(45) Date of Patent: Apr. 7, 2026

(54) DRIVING METHOD OF DISPLAY DEVICE, AND DISPLAY DEVICE

(71) Applicant: HKC CORPORATION LIMITED, Shenzhen (CN)

(72) Inventors: Mancheng Zhou, Shenzhen (CN); Yuanping Zhang, Shenzhen (CN); Junfeng Xie, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/733,841

(22) Filed: Jun. 5, 2024

(65) Prior Publication Data

US 2025/0014500 A1 Jan. 9, 2025

(30) Foreign Application Priority Data

Jul. 7, 2023 (CN) ........................ 202310830253.0

(51) Int. Cl.
*G09G 3/20* (2006.01)
*G09G 3/32* (2016.01)

(52) U.S. Cl.
CPC ......... *G09G 3/2096* (2013.01); *G09G 3/2007* (2013.01); *G09G 3/32* (2013.01); *G09G 2310/08* (2013.01); *G09G 2320/0233* (2013.01); *G09G 2340/0435* (2013.01)

(58) Field of Classification Search
CPC ....... G09G 2310/08; G09G 2320/0233; G09G 2340/0435; G09G 3/20; G09G 3/2007; G09G 3/2096; G09G 3/32
See application file for complete search history.

(56) References Cited

U.S. PATENT DOCUMENTS

| | | | | |
|---|---|---|---|---|
| 10,810,921 | B2 * | 10/2020 | Tian | G06F 3/0412 |
| 12,141,398 | B2 * | 11/2024 | Jung | G09G 3/3266 |
| 12,230,181 | B2 * | 2/2025 | Ahmed | G09G 3/32 |
| 12,236,813 | B2 * | 2/2025 | Lv | G09G 3/001 |
| 2005/0017993 | A1 * | 1/2005 | Choi | G09G 3/2014 345/691 |
| 2005/0219192 | A1 * | 10/2005 | Fujikawa | G09G 3/3688 345/98 |

(Continued)

FOREIGN PATENT DOCUMENTS

| | | | |
|---|---|---|---|
| CN | 101154004 | A | 4/2008 |
| CN | 101315755 | A | 12/2008 |

(Continued)

*Primary Examiner* — Kenneth Bukowski

(57) ABSTRACT

A driving method of a display device, and a display device are disclosed. The display device includes a driving chip and multiple selectors, the driving chip including a first pin connected to at least four scan lines through one selector, and a second pin connected to a data line. The driving method includes: generating a row initialization signal for driving at least four scan lines and outputting it to the selector via the first pin; controlling, by the selector, a corresponding output terminal to output the row initialization signal to the corresponding scan line for driving according to the control signal; where the row initialization signal is generated based on original scan signals of the at least four scan lines connected to the selector. The row initialization signal includes at least four scan cycles, each scan cycle being used to scan one respective scan line.

18 Claims, 6 Drawing Sheets

(56) References Cited

U.S. PATENT DOCUMENTS

| | | | | |
|---|---|---|---|---|
| 2008/0297457 | A1* | 12/2008 | Song | G09G 3/3648 345/89 |
| 2016/0358586 | A1* | 12/2016 | Song | G09G 5/12 |
| 2018/0268770 | A1* | 9/2018 | Nakanishi | G09G 3/3677 |
| 2019/0155433 | A1* | 5/2019 | Park | G06F 3/0416 |
| 2019/0237025 | A1* | 8/2019 | Keum | G09G 3/3233 |
| 2019/0265478 | A1* | 8/2019 | Cok | G02B 27/0172 |
| 2020/0251066 | A1* | 8/2020 | Hu | G09G 3/3677 |
| 2022/0036841 | A1* | 2/2022 | Guo | G09G 3/3674 |
| 2022/0206664 | A1* | 6/2022 | Jung | G09G 3/3266 |

FOREIGN PATENT DOCUMENTS

| | | | | | |
|---|---|---|---|---|---|
| CN | 102707527 | A | | 10/2012 | |
| CN | 104821151 | A | | 8/2015 | |
| CN | 111883084 | A | | 11/2020 | |
| CN | 113012609 | A | * | 6/2021 | G09G 3/006 |
| CN | 113593466 | A | | 11/2021 | |
| CN | 115273767 | A | | 11/2022 | |
| CN | 116246566 | A | | 6/2023 | |
| JP | 2004198908 | A | | 7/2004 | |
| JP | 2005284060 | A | | 10/2005 | |

* cited by examiner

DRIVING METHOD OF DISPLAY DEVICE, AND DISPLAY DEVICE

CROSS-REFERENCE TO RELATED APPLICATIONS

This application claims the priority and benefit of Chinese patent application number 2023108302530, titled "Driving Method of Display Device, and Display Device" and filed Jul. 7, 2023 with China National Intellectual Property Administration, the entire contents of which are incorporated herein by reference.

TECHNICAL FIELD

This application relates to the field of display technology, and more particularly relates to a driving method of a display device and a display device.

BACKGROUND

The description provided in this section is intended for the mere purpose of providing background information related to the present application but doesn't necessarily constitute prior art.

With the improvement of the quality of life, LED displays have put forward higher requirements for row drivers, from simple P-channel Metal-Oxide-Semiconductor Field-Effect Transistor (PMOSFET) that realizes row switching to multi-functional row drivers with higher integration and stronger functionality.

In a possible scan order, the output is performed in sequence according to the cascaded shift registers, and the scan order cannot be changed. Furthermore, with respect to any three scan lines, the scanning sequence of the middle scan line cannot be interrupted. That is, the first scan line must be scanned first, then the second scan line is scanned, and then the third scan line is scanned. It is impossible to jump directly to scanning the third scan line after the first scan line is scanned, resulting in an unchanging scanning order. Furthermore, one pin of the driving chip is correspondingly connected to one scan line or one data line, so that there are too many driving chip pins, which is not conducive to encapsulation.

SUMMARY

It is therefore one purpose of this application to provide a driving method of a display device and a display device, so as to reduce driving chip pins and realize arbitrary changes of the scanning order of a plurality of scan lines.

This application discloses a driving method for a display device. The display device includes a driving chip and a plurality of selectors. A first pin of the driving chip is connected to at least four scan lines through the respective selector. A second pin of the driving chip is connected to a respective data line.

The driving method includes the following operations:

generating a row initialization signal configured to drive the at least four scan lines and outputting the row initialization signal to the respective selector through the first pin of the driving chip; and controlling, by the selector, a corresponding output terminal of the selector to output the row initialization signal to the corresponding scan line for driving the corresponding scan line according to the control signal;

wherein the row initialization signal is generated based on original scan signals of the at least four scan lines connected to the selector; where the row initialization signal includes at least four scan cycles, where each scan cycle is configured to scan one respective scan line.

In some embodiments, the operation of the selector controlling the corresponding output terminal of the selector to output the row initialization signal to the corresponding scan line for driving the corresponding scan line according to the control signal includes:

obtaining grayscale voltages of pixels located in a same column corresponding to the at least four scan lines connected to a current selector;

arranging the grayscale voltages of the pixels located in the same column in an order of their values; and sequentially outputting, by the selector, the row initialization signal to corresponding scan lines for driving the corresponding scan lines in an order of the values of the grayscale voltages.

In some embodiments, the operation of the selector controlling the corresponding output terminal of the selector to output the row initialization signal to the corresponding scan line for driving the corresponding scan line according to the control signal includes:

obtaining the grayscale voltages of pixels located in a same column corresponding to the at least four scan lines connected to a current selector; and determining whether the grayscale voltage corresponding to any one of the at least four scan lines represents a black image; if it is determined that the grayscale voltage corresponding to any one of the at least four scan lines represents a black image, controlling the respective output terminal of the selector corresponding to the scan line to not output a signal so that the corresponding scan line is not driven; if it is determined that the grayscale voltage corresponding to each of the at least four scan lines does not represent a black image, controlling, the selector the corresponding output terminal of the selector to output the row initialization signal to the corresponding scan line for driving the corresponding scan line according to the control signal.

In some embodiments, the operation of the selector controlling the corresponding output terminal of the selector to output the row initialization signal to the corresponding scan line for driving the corresponding scan line according to the control signal includes:

obtaining a current refresh rate of the display device and grayscale voltages of pixels in a same column corresponding to the at least four scan lines connected to a current selector; and if it is determined that the current refresh rate is greater than the first preset refresh rate, the current refresh rate is determined to be a high refresh rate; when a brightness corresponding to any one of the at least four scan lines is greater than a first preset brightness, controlling a turned-on period of the corresponding scan line to be two frames; if the brightness corresponding to any one of the at least four scan lines is less than a second preset brightness, controlling the turned-on period of the corresponding scan line to be one-half frame; if the current refresh rate is less than the first preset refresh rate, controlling the corresponding output terminal of the selector to output the row initialization signal to the corresponding scan line for driving the corresponding scan line according to the control signal.

In some embodiments, the selector is an eight-channel selector. The control signal includes a first control signal, a second control signal, and a third control signal. Prior to the operation of the selector controlling the corresponding output terminal of the selector to output the row initialization signal to the corresponding scan line for driving the corresponding scan line according to the control signal, the first control signal, the second control signal, and the third control signal each simultaneously output a first level signal to the selector, so that the corresponding scan lines connected the selector are not driven, where the first level signal is a low level signal.

Optional, the plurality of selectors are divided into first selector and second selector. The first selector and the second selector are disposed at intervals. The scan lines corresponding to the first selector are driven earlier. The scan lines of the second selector are driven later. The control signal of the first selector is the same as the control signal of the second selector. A delayer is disposed between the second selector and the output terminal of the control signal of the driving chip. The operation of the selector controlling the corresponding output terminal of the selector to output the row initialization signal to the corresponding scan line for driving the corresponding scan line according to the control signal includes:

controlling, by the first selector, the corresponding output terminal of the first selector to output the row initialization signal to the corresponding scan line for time-sharing driving according to the respective control signal; and controlling, by the second selector, the corresponding output terminal of the second selector to output the row initialization signal to the corresponding scan line for time-sharing driving according to the respective control signal.

In some embodiments, the control signal includes a first level signal and a second level signal, and the operation of the selector controlling the corresponding output terminal of the selector to output the row initialization signal to the corresponding scan line for driving the corresponding scan line according to the control signal further includes:

selecting, by each of the first control signal, the second control signal, and the third control signal, to output the first level signal or the second level signal according to the row initialization signal to control the corresponding output terminal of the selector to output the row initialization signal to the corresponding scan line.

This application further discloses a display device. The display device includes a display panel and a driving module. The driving module includes a driving chip and a plurality of selectors. The display panel includes scan lines and data lines. The driving chip includes a plurality of first pins, a plurality of second pins, and a plurality of third pins. The first pins and the third pins are connected to the selectors. The second pins are connected to the data lines. Each of the selectors is connected to at least four scan lines. Each third pin outputs a control signal to the respective selector. The display device is driven using the following driving method, including:

generating a row initialization signal that drives at least four scan lines connected to each selector and outputting the row initialization signal to the selector through the first pin of the driving chip; and controlling, by the selector, a corresponding output terminal of the selector to output the row initialization signal to the corresponding scan line for driving the corresponding scan line according to a respective control signal;

wherein the row initialization signal is generated based on the original scan signals of the at least four scan lines connected to the selector, where the row initialization signal includes at least four scan cycles, where each scan cycle being configured to scan one respective scan line.

In some embodiments, the display panel includes a mini-LED screen. The display panel further includes a plurality of LED lights enclosed and driven by the scan lines and data lines. The plurality of LED lights are arranged in a plurality of rows and a plurality of columns. The anode of the LED is connected to the respective scan line. The cathode of the LED is connected to the respective data line. The driving module includes a printed circuit board. The driving chip and the plurality of selectors are disposed on the printed circuit board.

In some embodiments, the display device further includes a delayer. Every two adjacent selectors in the plurality of selectors are put into a group. Of each group of selectors, the one with the scan lines driven earlier is a first selector. The one with the scan lines driven later is a second selector. The second selector is connected between the first selector and the third pin of the driving chip through the delayer.

Compared with the possible driving method in which scanning can only be performed in sequence, when scanning the previous row and the next row of scan lines in this application, if the voltage difference is too large, parasitic capacitance may be generated after scanning and display. The generated parasitic capacitance may affect the display of the pixel in the next row, and the grayscale voltage may change greatly and the loss may be relatively large. By adding a selector, the row initialization signal is generated based on the original scanning signals of the at least four scan lines connected to the selector. The selector controls the corresponding output terminal of the selector to output the row initialization signal to the corresponding scan line for driving the corresponding scan line according to the control signal. When outputting the scan signal to the scan lines, any scan line may be selected to input the scan signal for scanning, breaking the current scanning method that can only scan in sequence. Furthermore, by using the selector, the output pin on the driving chip corresponding to one scan signal may be used to output row initialization signals corresponding to a plurality of scan lines, and the selector can select the corresponding scan line for driving.

BRIEF DESCRIPTION OF DRAWINGS

The accompanying drawings are used to provide a further understanding of the embodiments according to this application, and constitute a part of the specification. They are used to illustrate the embodiments according to this application, and explain the principle of this application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
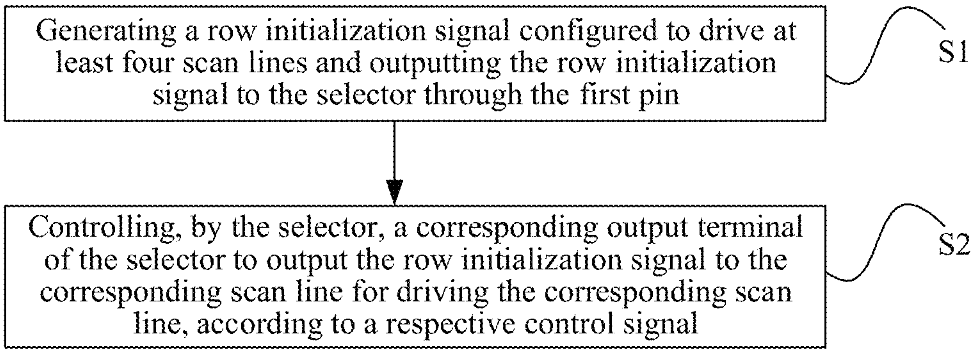
FIG. 1 is a schematic flow chart of a driving method according to a first embodiment of this application.

In the drawings: 100. Display device; 110. Scan line; 120. Data line; 130. Selector; 131. First selector; 132. Second selector; 140. Driving chip; 141. First pin; 142. Second pin; 143. Third pin; 150. Delayer; 200. Display panel; 300. Driving module; 310. Printed circuit board.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Terms "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in this application can be understood depending on specific contexts.

Hereinafter this application will be described in further detail with reference to the accompanying drawings and some optional embodiments.

As illustrated in FIG. 1, as a first embodiment of this application, a driving method of a display device 100 is disclosed. The display device 100 includes a driving chip 140 and a plurality of selectors 130. A first pin 141 of the driving chip 140 is connected to at least four scan lines 110 through a selector. The second pin 142 is connected to a data line 120. The driving method includes the following operations:

S1: generating a row initialization signal that drives at least four scan lines and outputting the row initialization signal to the selector through the first pin; and S2: controlling, by the selector, a corresponding output terminal of the selector to output the row initialization signal to the corresponding scan line for driving the corresponding scan line according to a control signal;

wherein the row initialization signal is generated based on the original scan signals of the at least four scan lines connected to the selector, where the row initialization signal includes at least four scan cycles, and each scan cycle corresponds to one scan line for scanning this scan line.

Figure 2:
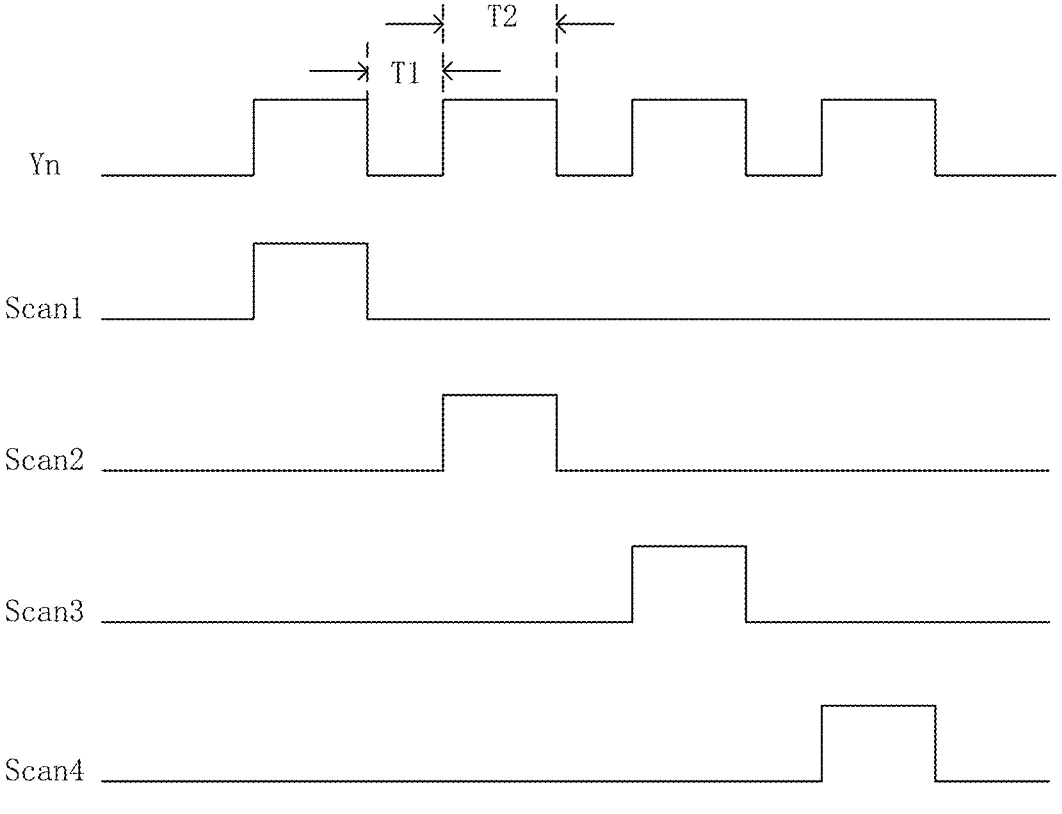
FIG. 2 is a waveform diagram of row initialization signals of the first embodiment of this application.
Figure 3:
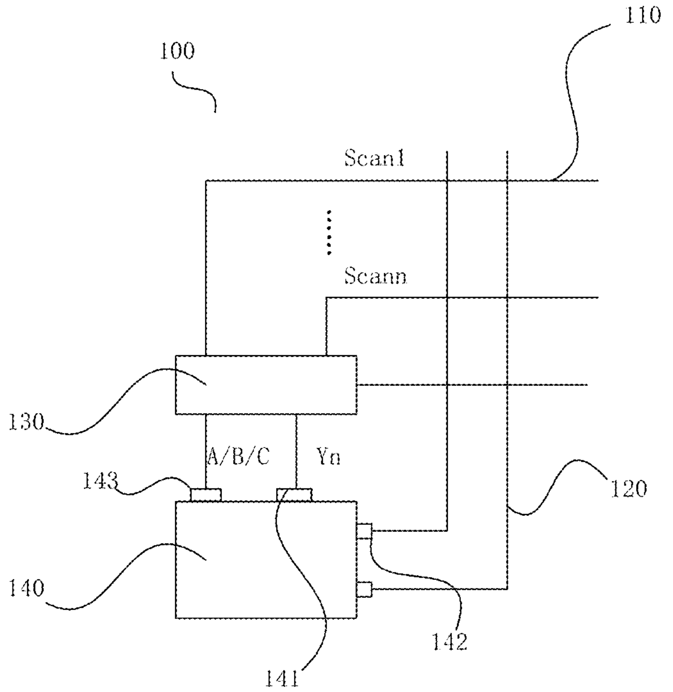
FIG. 3 is a schematic diagram of a display device according to the first embodiment of this application.

Referring to FIGS. 1 to 3, this application adds a selector 130 between the driving chip and the scan lines. The selector is at least a four-channel selector and may be connected to four scan lines 110, including the first scan line, the second scan line, the third scan line, and the fourth scan line. There may be two types of signals between the driving chip 140 and the selector 130, namely the row initialization signal and the control signal A/B/C. The control signal controls the output of the selector. When the row initialization signal Yn needs to be output to the first scan line, the control signal controls the corresponding output terminal of the selector to output the row initialization signal to the first scan line for scanning the first scan line. When the row initialization signal needs to be output to the third scan line, the control signal controls the corresponding output terminal of the selector to output the row initialization signal to the third scan line for scanning the third scan line. That is, there is no need to scan the first scan line, the second scan line, the third scan line, and the fourth scan line in order, breaking the driving method that can only scan the scan lines in sequence. Furthermore, since scanning can be done in any order, settings can be made as needed. For example, it is possible to perform scanning according to the grayscale voltages in order from large grayscale voltages to small grayscale voltages in a descending order of the values of the grayscale voltages, or scanning from small grayscale voltages to large grayscale voltages in an ascending order of the values of the grayscale voltages, or scanning according to the scanning order of the previous line, which may be set as needed. Furthermore, because the selector is added, one pin of the driving chip 140 can be connected to at least four scan lines through the selector, which is beneficial to reducing the size of the driving chip 140 and facilitating encapsulation. Selectors with different channels may be chosen based on the sizes of the delineated sections. For example, if four scan lines are defined as one section, then this section corresponds to a four-channel selector. If eight scan lines are defined as one section, then this section corresponds to an eight-channel selector. Alternatively, if more scan lines, such as 16, 32, or 64 are defined as one section, then the number of channels of the selector is the corresponding number of scan lines included in this defined section. It should also be noted that when dividing the scan lines, they may or may not be equally divided. For example, with respect to the first 100 scan lines, every four scan lines may be divided into one section, while with respect to the remaining scan lines, every 8 or 16 or even more scan lines may be divided into one section. Selectors of different channels may be selected and connected correspondingly.

Figure 4:
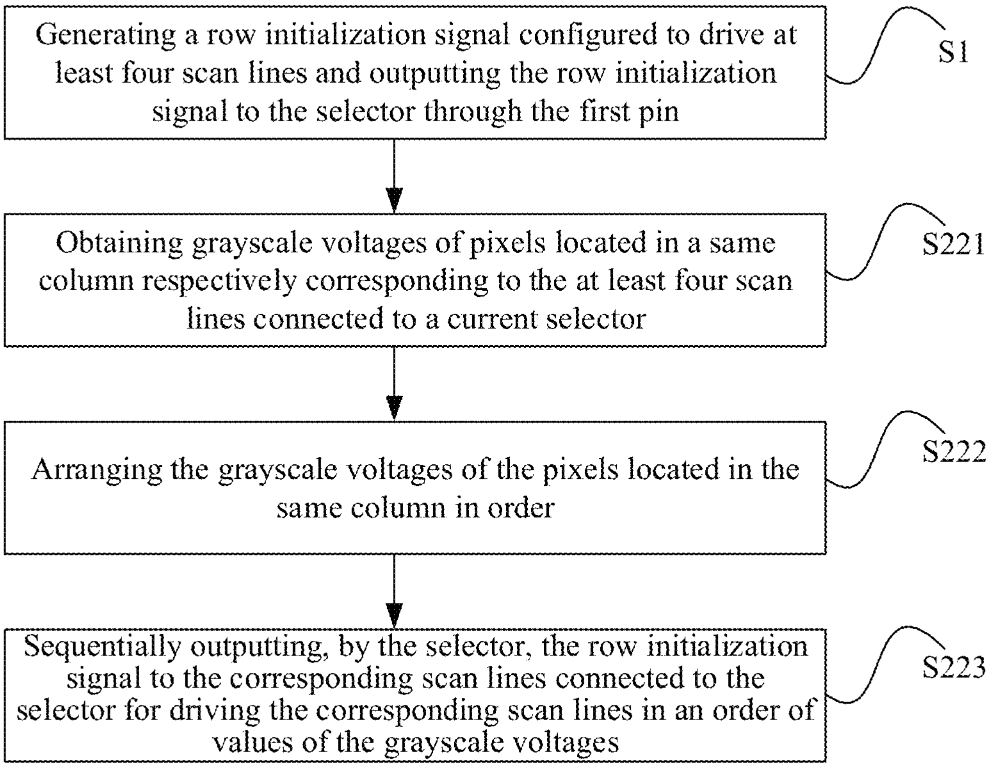
FIG. 4 is a schematic flow chart of a driving method according to a second embodiment of this application.

As illustrated in FIG. 4, there is illustrated a second embodiment of this application, which is a further refinement of the above-described first embodiment. The operation of the selector controlling the corresponding output terminal of the selector to output the row initialization signal to the corresponding scan line for driving the corresponding scan line according to the control signal includes:

- S221: obtaining the grayscale voltages of pixels in a same column respectively corresponding to the at least four scan lines connected to a current selector;
- S222: arranging the grayscale voltages of the pixels in the same column in order of their values; and
- S223: sequentially outputting, by the selector, the row initialization signal to corresponding scan lines for driving the corresponding scan lines in order of the values of the grayscale voltages.

In this embodiment, it is mainly contemplated that the grayscale voltage on the data line is constantly changing, and the parasitic capacitance or loss caused by the changing may affect the display of the next line. Take three grayscale voltages of different values as an example. Assume the grayscale voltage of the corresponding data line when scanning the first scan line is 5V, the grayscale voltage of the corresponding data line when scanning the second scan line is −3V, and the grayscale voltage of the corresponding data line when scanning the third scan line is 1V. In the case of sequential scanning, the grayscale voltage changes from 5V to −3V, and then from −3V to 1V. As such, the changes of the grayscale voltage are relatively large. Furthermore, both changes may cause relatively great losses, which may result in insufficient charging when the polarity is converted. Taking this into account, the grayscale voltages are first obtained and then sorted. The scanning sequence is based on the values of the grayscale voltages. That is, the first scan line may be scanned first, then the third scan line is scanned, and finally the second scan line is scanned. That is, the grayscale voltage values first change from 5V to 1V, and then from 1V to −3V. In this way, the changing amplitudes of the grayscale voltage are reduced every time, which can save the voltage adjusting times and improve the actual charging times of the pixels. It can also reduce the loss when the data voltage changes thus avoiding parasitic capacitance from affecting the display of pixels.

Figure 5:
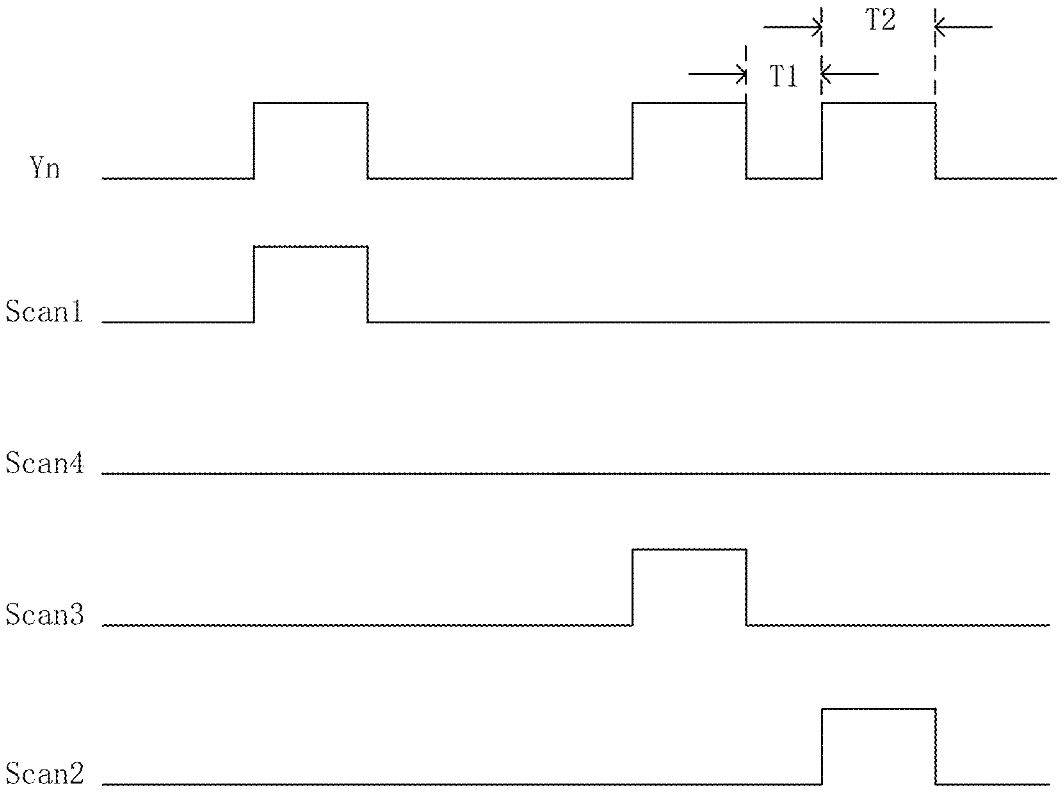
FIG. 5 is a schematic diagram of waveforms of row initialization signals according to the second embodiment of this application.

Further, as illustrated in FIG. 5, considering that the grayscale voltage may correspond to a black image, after operation S221, it is determined whether the grayscale voltage corresponding to any one of the at least four scan lines (such as the second scan line) represents a black image. If the grayscale voltage corresponding to any one of the at least four scan lines represents a black image, then the output terminal of the selector corresponding to the scan line does not output a signal so that the corresponding scan line is not driven, and the scan signals Scan4, Scan3 and Scan2 are all low levels. If the grayscale voltage corresponding to each of the at least four scan lines is not a black image, then the selector controls the corresponding output terminal of the selector to output the row initialization signal to the corresponding scan line for driving the corresponding scan line according to the control signal. When a certain row is actually displayed as black, it can be seen that the scan line of this row does not need to be turned on, and the parasitic capacitance on this row of scan line will not charge and discharge, thereby saving power consumption.

Figure 6:
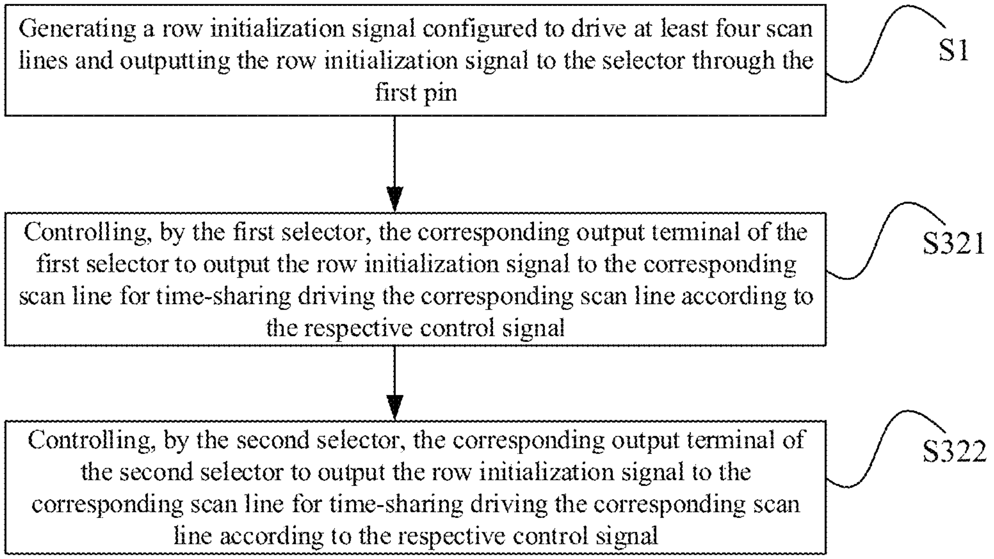
FIG. 6 is a schematic flowchart of a driving method according to a third embodiment of this application.
Figure 7:
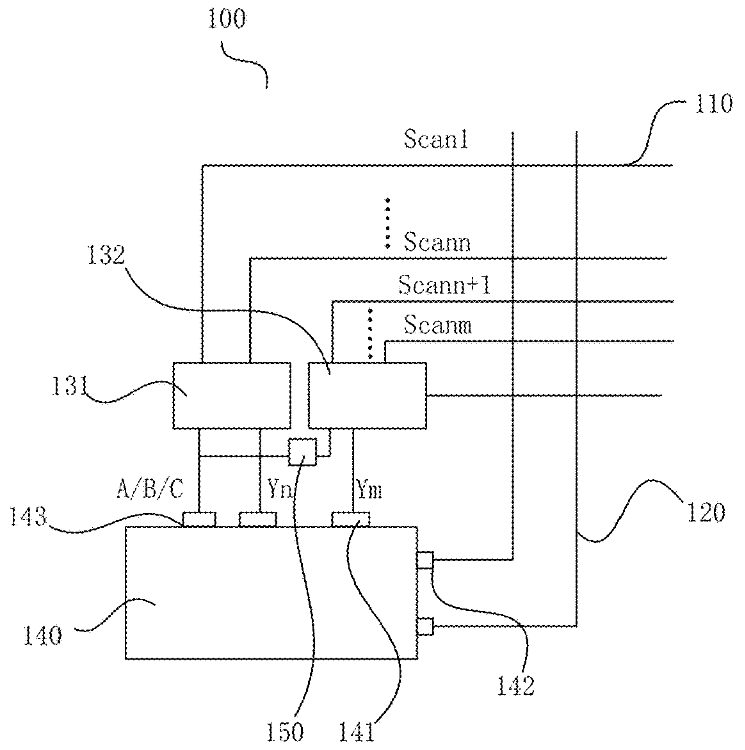
FIG. 7 is a schematic diagram of a display device according to the third embodiment of this application.

As illustrated in FIG. 6, there is illustrated a third embodiment of this application, which is a further refinement of the above-described first embodiment. Referring to FIG. 6 and FIG. 7, the plurality of selectors 130 are divided into a first selector 131 and a second selector 132. The first selector 131 and the second selector 132 are arranged at intervals. The scan lines 110 corresponding to the first selector 131 are driven earlier. The scan lines 110 of the second selector 132 are driven later. The control signal A/B/C of the first selector 131 is the same as the control signal A/B/C of the second selector 132. A delayer 150 is connected between the second selector 132 and the output terminal of the control signal of the driving chip 140. As illustrated in FIG. 6, the operation S2 includes:

- S321: controlling, by the first selector, the corresponding output terminal of the first selector to output the row initialization signal to the corresponding scan line for time-sharing driving the corresponding scan line according to the respective control signal; and
- S322: controlling, by the second selector, the corresponding output terminal of the second selector to output the row initialization signal to the corresponding scan line for time-sharing driving the corresponding scan line according to the respective control signal.

Referring to FIG. 6 and FIG. 7, in order to further save the pins of the driving chip 140, the control signal A/B/C may be shared by every two adjacent selectors 130. In this way, the driving chip 140 does not need to set two sets of pins corresponding to the control signal, thereby further reducing the number of pins. However, it needs to be considered that if one set of control signals are shared, two scan lines respectively corresponding to the two selectors 130 may be turned on at the same time. If the grayscale voltages corresponding to the two scan lines are different when scanning, then turning them on at the same time in this case may cause mischarging of the pixels. Based on this, a delayer 150 is additionally set. After all scan lines corresponding to the first selector are scanned, the scan lines corresponding to the second selector receive the control signal so that the second selector controls the corresponding output terminal of the second selector to output the row initialization signals for time-sharing driving, thereby reducing the number of pins and avoiding mischarging.

Figure 8:
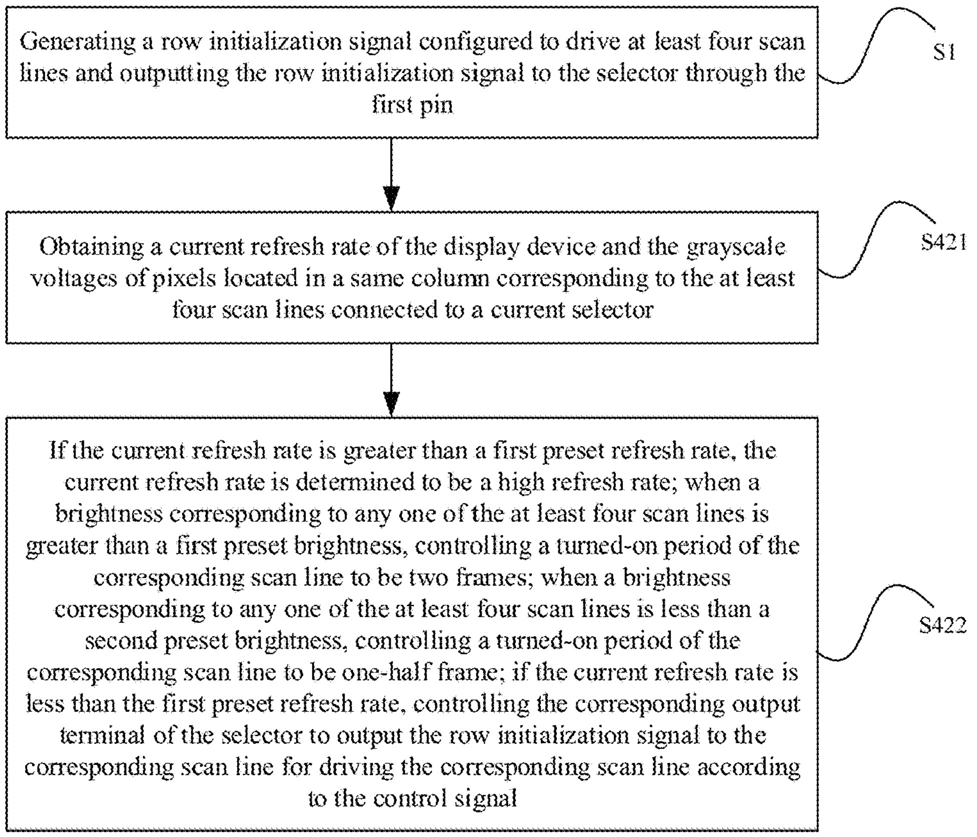
FIG. 8 is a schematic flowchart of a driving method according to a fourth embodiment of this application.

As illustrated in FIG. 8, as a fourth embodiment of this application, it is different from the above embodiment in that operation S2 includes:

- S421: obtaining a current refresh rate of the display device and the grayscale voltages of pixels located in a same column corresponding to the at least four scan lines connected to a current selector; and
- S422: if the current refresh rate is greater than a first preset refresh rate, the current refresh rate is determined to be a high refresh rate; when a brightness corresponding to any one of the at least four scan lines is greater than a first preset brightness, then controlling a turned-on period of the corresponding scan line to be two frames; when a brightness corresponding to any one of the at least four scan lines is less than a second preset brightness, then controlling a turned-on period of the corresponding scan line to be one-half frame; if the current refresh rate is less than the first preset refresh rate, controlling the corresponding output terminal of the selector to output the row initialization signal to the corresponding scan line for driving the corresponding scan line according to the control signal.

This embodiment mainly considers the situation where the brightness of a certain row is too bright under a high refresh condition, resulting in uneven display brightness. In this application, in the case of a high refresh rate, the scan line may be turned on once less so that the brightness may be reduced and the power consumption may also be reduced. Of course, if the brightness of a certain row is too dark, the brightness may be increased by turning it on one more time under a high refresh condition.

To sum up, because a certain row may be selectively turned on and off, the waveform of the initialization signal of this row is helpful for the power consumption in dark state and color cast adjustment under normal display. In addition, because the number of output channels of the driving chip is reduced, the encapsulation size may also be reduced.

Figure 9:
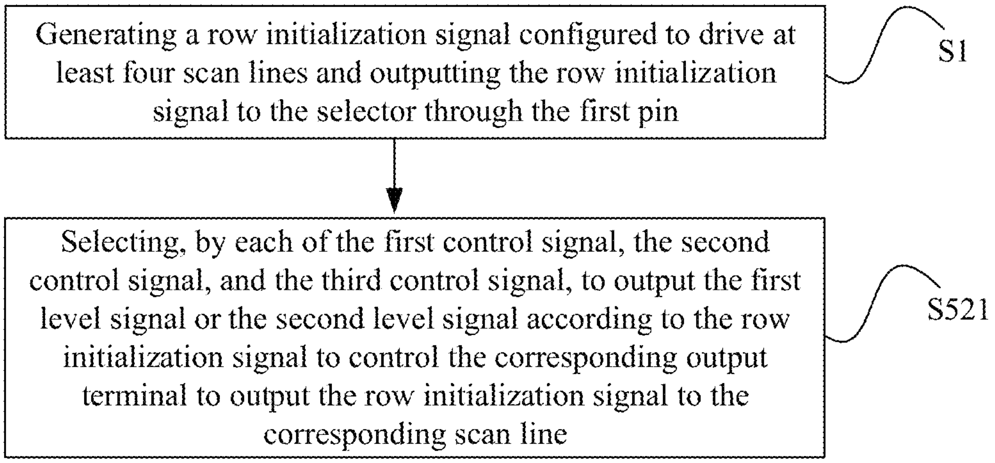
FIG. 9 is a schematic flowchart of a driving method according to a fifth embodiment of this application.
Figure 10:
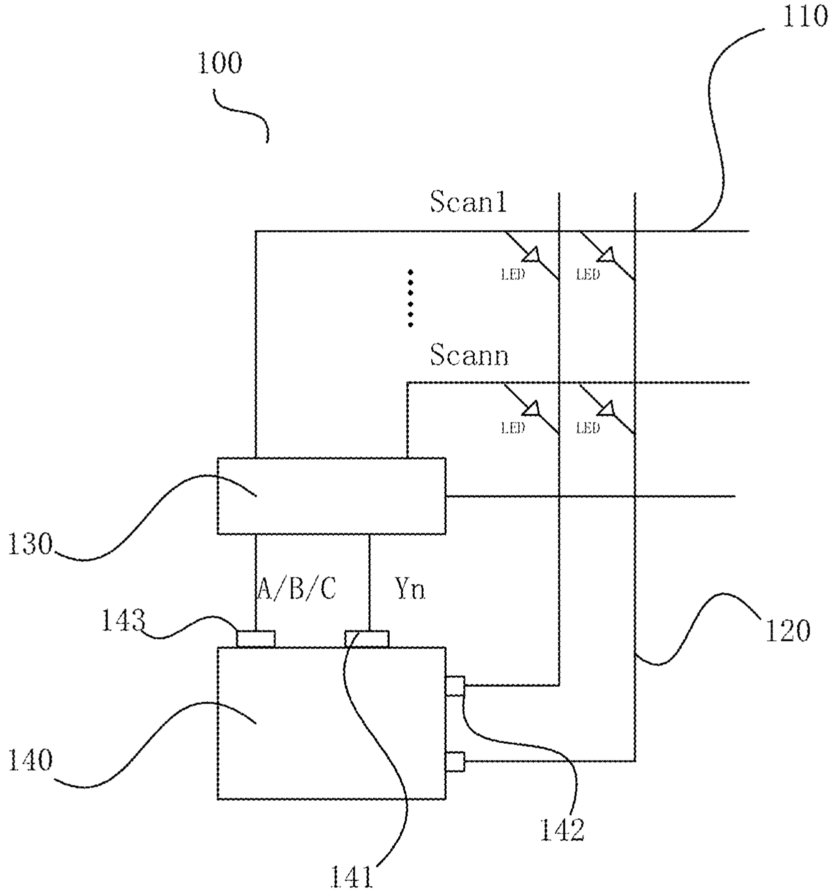
FIG. 10 is a schematic diagram of a display device according to the fifth embodiment of this application.

As illustrated in FIG. 9, there is shown a fifth embodiment of this application, which is a further limitation on any of the above embodiments. Take a display device using mini-LED direct display and the selector being an eight-channel selector as an example. In particular, the control signal includes a first control signal A, a second control signal B, and a third control signal C. Before the operation of the selector controlling the corresponding output terminal of the selector to output the row initialization signal to the corresponding scan line for driving the corresponding scan line according to the control signal, the first control signal, the second control signal, and the third control signal each simultaneously output a first level signal to the selector. In this case, the scan lines corresponding to the selector are not driven, where the first level signal is a low level signal.

The control signal includes a first level signal L and a second level signal H, and the operation S2 further includes:

S521: selecting, by each of the first control signal, the second control signal, and the third control signal, to output the first level signal or the second level signal according to the row initialization signal to control the corresponding output terminal to output the row initialization signal to the corresponding scan line.

Referring to FIGS. 2 to 10, this embodiment uses an eight-channel selector as an example for illustration. In fact, there is a plurality of selectors in a display device. The second pin on the driving chip is set according to the number of control signals. Referring to Table 1 below (selector truth table), where ABC represents the 3 input signals of the selector, OUT denotes the output enable channel, Yn denotes the output channel, and L/H represents the low/high status of the input signal. It can be seen that Yn represents the scanning signals SCANn of the scan lines driven in sequence, as long as the high and low level voltages are consistent. The mini-LED high and low levels are 5V/0V, which just lies within the range of the voltages of the selector.

Specifically, when displaying normally, the driving chip first sends H/L (high and low) of A/B/C. At this time, the row initialization signal is low. When the selector receives the high and low statuses of A/B/C, such as L/L/H, the selector selects Y1 as the output channel, that is, Y1=row initialization signal, the previous operating row is turned off, Y1=low. After time Tl (display row interval time), the row initialization signal is high, Y1=high, the row is turned on, and the LED is started to operate. In particular, during the T2 time period, the high and low statuses of A/B/C cannot be changed to keep the SCAN signal from becoming faulty. It can be seen from the above that if the levels of A/B/C are different, the output channels will be different. See Table 1 below for details:

TABLE 1

(selector truth table)

| A | B | C | OUT |
|---|---|---|---|
| L | L | L | Y0 |
| L | L | H | Y1 |
| L | H | L | Y2 |
| L | H | H | Y3 |
| H | L | L | Y4 |
| H | L | H | Y5 |
| H | H | L | Y6 |
| H | H | H | Y7 |

Figure 11:
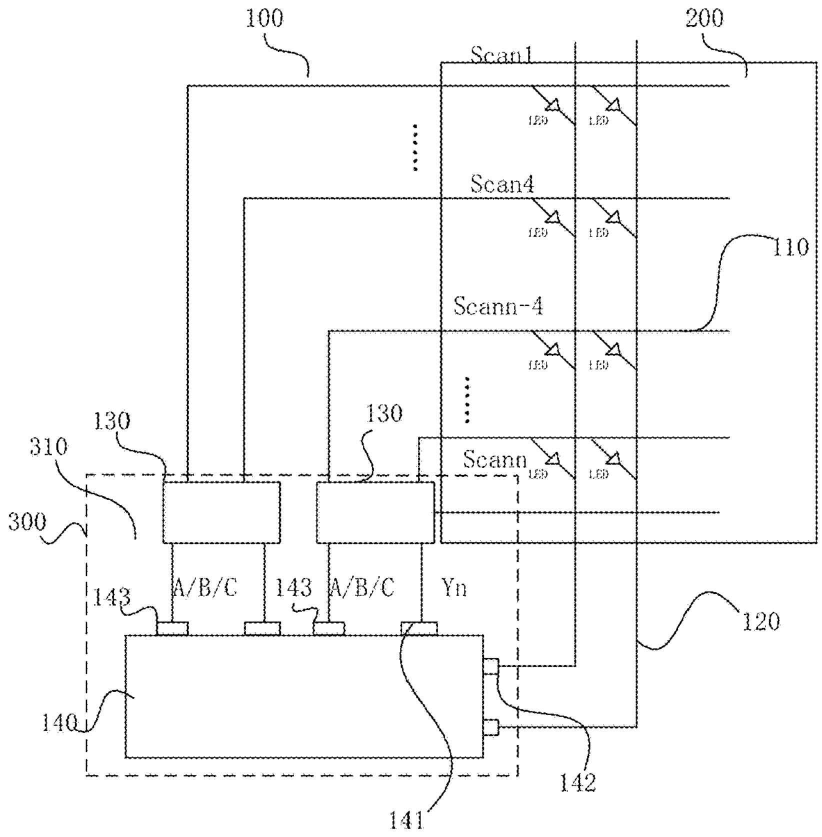
FIG. 11 is a schematic diagram of a display device according to a sixth embodiment of this application.

As illustrated in FIG. 11, as a sixth embodiment of this application, a display device 100 is disclosed. The display device 100 is driven using the driving method described in any of the above embodiments. The display device 100 includes a display panel 200 and a driving module 300. The driving module 300 includes a driving chip 140 and a plurality of selectors 130. The display panel 200 includes scan lines 110 and data lines 120. The driving chip 140 includes a plurality of first pins 141, a plurality of second pins 142, and a plurality of third pins 143. The first pins 141 and the third pins 143 are connected to the selectors 130. The second pins 142 are connected to the data lines 120. Each selector 130 is connected to at least four scan lines 110. Each first pin 141 outputs a row initialization signal to the respective selector 130. Each third pin 143 outputs a control signal to the respective selector 130.

This application uses the selector 130 to output the row initialization signals to drive the scan lines 110. There are two types of signals between the driving chip 140 and the selector 130, namely, the row initialization signal and the control signal. The control signal controls the output of selector 130. When the row initialization signal needs to be output to the first scan line Scan1, the control signal controls the corresponding output terminal of the selector 130 to output the row initialization signal to the first scan line Scan1 for scanning. When the row initialization signal needs to be output to the third scan line Scan3, the control signal controls the corresponding output terminal of the selector 130 to output the row initialization signal to the third scan line Scan3 for scanning. That is, there is no need to scan the first scan line Scan1, the second scan line Scan2, the third scan line Scan3, and the fourth scan line Scan4 in order, breaking the driving method that can only scan the scan lines 110 in sequence. Furthermore, since scanning can be done in any order, the scan order can be set as needed. For example, it is possible to perform scanning according to the grayscale voltages from large grayscale voltages to small grayscale voltages in a descending order of the values of the values of the grayscale voltages, or scan from small grayscale voltages to large grayscale voltages in an ascending order of the values of the grayscale voltages, or scan according to the scanning order of the previous line, which may be set as needed. Furthermore, because the selector 130 is added, one pin of the driving chip 140 can be connected to at least four scan lines 110 through the selector 130, which is beneficial to reducing the size of the driving chip 140 and facilitating encapsulation.

Further, the display panel 200 includes a mini-LED screen. The display panel 200 further includes a plurality of LED lights enclosed and driven by the scan lines 110 and the data lines 120. The plurality of LED lights are arranged in a plurality of rows and columns. An anode of each LED is connected to the respective scan line 110. A cathode of the LED is connected to the respective data line 120. The driving module 300 includes a printed circuit board 310. The driving chip 140 and the plurality of selectors 130 are disposed on the printed circuit board 310. Two driver ICs, namely the row tube (responsible for Row signal) and column tube (responsible for OUT signal), are integrated as a two-in-one driver IC. The selector 130 and the driving chip 140 are both arranged on the printed circuit board 310, which improves encapsulating efficiency. It should be noted that the display device of this application may be a mini LED display panel or an LCD display panel.

Figure 12:
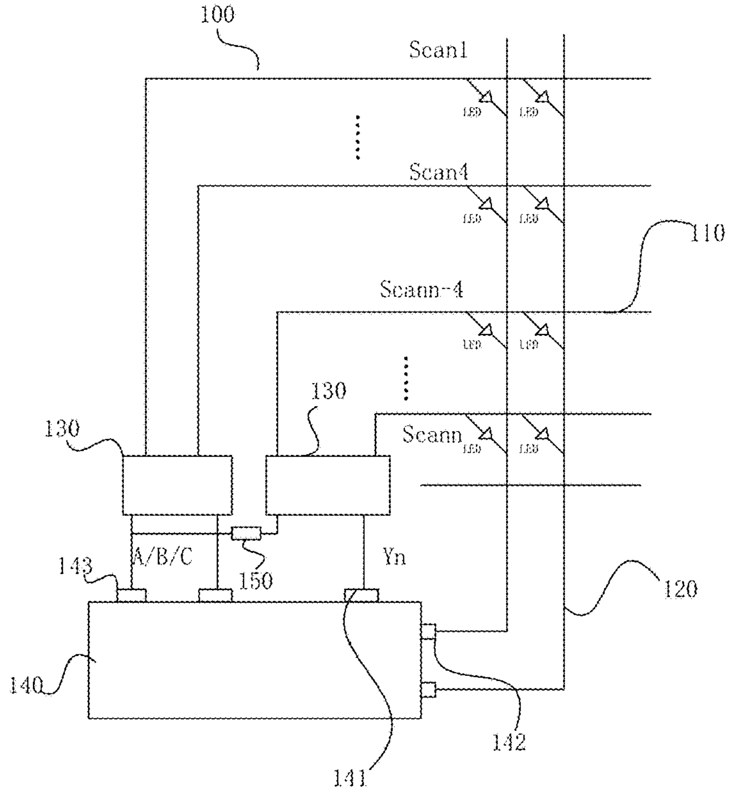
FIG. 12 is a schematic diagram of a display device according to a seventh embodiment of this application.

As illustrated in FIG. 12, as a seventh embodiment of this application, a display device 100 is disclosed. The display device 100 further includes a delayer 150. Two adjacent selectors 130 in the plurality of selectors 130 are divided into a group. Of each group of selectors 130, the scan lines 110 driven earlier are connected to the first selector 131, the scan lines 110 driven later are connected to the second selector 132. The second selector 132 is connected between the first selector 131 and the third pin 143 through a delayer 150.

Considering that if the pins of the driving chip 140 are further reduced, then the control signals may be shared by two selectors 130 or three selectors 130. Taking two selectors 130 sharing a set of control signals as an example. Sharing a set of control signals may cause two scan lines 110 among the scan lines 110 corresponding to the two selectors 130 to be turned on at the same time. If the grayscale voltages corresponding to the two scan lines 110 are different when scanning, then turning them on at the same time in this case may cause mischarging of the pixels. Based on this, a delayer 150 is disposed corresponding to each selector 130. Before the control signal is input to the selector 130, it is first input into the delayer 150 and then reaches the selector 130 after a preset time of delay. That is, after all the scan lines 110 corresponding to the first selector 130 are scanned, the scan lines 110 corresponding to the second selector receive the control signal to control the corresponding output terminal of the second selector 132 to output the row initialization signal for time-sharing driving, thereby avoiding the occurrence of mischarging on the basis of reducing the number of pins.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

It should be noted that the inventive concept of this application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of this application with reference to some specific illustrative embodiments, and the specific implementations of this application are not to be limited to these illustrative embodiments. For those having ordinary skill in the technical field to which this application pertains, numerous deductions or substitutions may be made without departing from the concept of this application, which shall all be regarded as falling in the scope of protection of this application.

What is claimed is:

1. A driving method for a display device, the display device comprising a driving chip and a plurality of selectors; wherein the driving chip comprises a first pin connected to at least four scan lines through each of the plurality of selectors, and a second pin connected to a respective data line; wherein the driving method comprises:

generating a row initialization signal configured to drive the at least four scan lines connected to each of the plurality of selectors and outputting the row initialization signal to the selector through the first pin of the driving chip; and controlling, by the selector, a corresponding output terminal of the selector to output the row initialization signal to the corresponding scan line for driving the corresponding scan line, according to a respective control signal;

wherein the row initialization signal is generated based on original scan signals of the at least four scan lines connected to the selector; wherein the row initialization signal comprises at least four scan cycles, each scan cycle being configured to scan one respective scan line;

wherein the operation of the selector controlling the corresponding output terminal of the selector to output the row initialization signal to the corresponding scan line for driving the corresponding scan line according to the control signal comprises:

obtaining grayscale voltages of pixels located in a same column respectively corresponding to the at least four scan lines connected to a current selector; and determining whether the grayscale voltage corresponding to any one of the at least four scan lines represents a black image; in response to determining the grayscale voltage corresponding to any one of the at least four scan lines represents a black image, controlling the respective output terminal of the selector corresponding to the scan line to not output a signal so that the corresponding scan line is not driven; in response to determining that the grayscale voltage corresponding to each of the at least four scan lines does not represent a black image, controlling, by the selector, the corresponding output terminal of the selector to output the row initialization signal to the corresponding scan line for driving the corresponding scan line according to the respective control signal.

2. The driving method as claimed in claim 1, wherein the operation of the selector controlling the corresponding output terminal of the selector to output the row initialization signal to the corresponding scan line for driving the corresponding scan line according to the respective control signal comprises:

obtaining grayscale voltages of pixels located in a same column respectively corresponding to the at least four scan lines connected to a current selector;

arranging the grayscale voltages of the pixels located in the same column in order; and sequentially outputting, by the selector, the row initialization signal to the corresponding scan lines connected to the selector for driving the corresponding scan lines in an order of values of the grayscale voltages.

3. The driving method as recited in claim 2, further comprising the following operation subsequent to the operation of obtaining the grayscale voltages of the pixels located in the same column respectively corresponding to the at least four scan lines connected to the current selector further:

determining whether the grayscale voltage corresponding to any one of the at least four scan lines represents a black image; in response to determining that the grayscale voltage corresponding to any one of the at least four scan lines represents a black image, controlling the respective output terminal of the selector corresponding to the scan line to not output a signal so that the corresponding scan line is not driven; in response to determining that the grayscale voltage corresponding to each of the at least four scan lines does not represent a black image, controlling, by the selector, the corresponding output terminal of the selector to output the row initialization signal to the corresponding scan line for driving the corresponding scan line according to the control signal.

4. The driving method as recited in claim 2, wherein the operation of the selector sequentially outputting the row initialization signal to the corresponding scan lines for driving the corresponding scan lines in an order of values of the grayscale voltages comprises:

sequentially outputting, by the selector, the row initialization signal to the corresponding scan lines for driving the corresponding scan lines connected to the selector in a descending order of the values of the grayscale voltages.

5. The driving method as recited in claim 2, wherein the operation of the selector sequentially outputting the row initialization signal to the corresponding scan lines for driving the corresponding scan lines connected to the selector in an order of values of the grayscale voltages comprises:

sequentially outputting, by the selector, the row initialization signal to the corresponding scan lines for driving the corresponding scan lines in an ascending order of the values of the grayscale voltages.

6. The driving method as recited in claim 1, wherein the operation of the selector controlling the corresponding output terminal of the selector to output the row initialization signal to the corresponding scan line for driving the corresponding scan line according to the control signal comprises:

obtaining a current refresh rate of the display device and grayscale voltages of pixels located in a same column respectively corresponding to the at least four scan lines connected to a current selector; and in response to determining that the current refresh rate is greater than a first preset refresh rate, determining that the current refresh rate is a relatively high refresh rate; in response to determining that a brightness corresponding to any one of the at least four scan lines is greater than a first preset brightness, controlling a turned-on period of the corresponding scan line to be two frames so that the corresponding scan line is turned on once every two frames;

in response to determining that the brightness corresponding to any one of the at least four scan lines is less than a second preset brightness, controlling the turned-on period of the corresponding scan line to be one-half frame so that the corresponding scan line is turned on once every one-half frame; in response to determining that the current refresh rate is less than the first preset refresh rate, controlling the corresponding output terminal of the selector to output the row initialization signal to the corresponding scan line for driving the corresponding scan line according to the control signal.

7. The driving method as recited in claim 1, wherein the selector comprises an eight-channel selector; wherein the control signal comprises a first control signal, a second control signal, and a third control signal; wherein prior to the operation of the selector controlling the corresponding output terminal of the selector to output the row initialization signal to the corresponding scan line for driving the corresponding scan line according to the control signal, simultaneously outputting, by each of the first control signal, the second control signal, and the third control signal, a first level signal to the selector so that the scan lines corresponding to the selector are not driven, the first level signal being a low level signal.

8. The driving method as recited in claim 1, wherein the plurality of selectors comprise a first selector and a second selector that are arranged at intervals, wherein the scan lines corresponding to the first selector are driven earlier than the scan lines corresponding to the second selector, wherein the control signal of the first selector is identical with the control signal of the second selector; wherein there is disposed a delayer between the second selector and a corresponding output terminal of the control signal of the driving chip, wherein the operation of the selector controlling the corresponding output terminal of the selector to output the row initialization signal to the corresponding scan line for driving the corresponding scan line according to the control signal comprises:

controlling, by the first selector, the corresponding output terminal of the first selector to output the respective row initialization signal to the corresponding scan line connected to the first selector for time-sharing driving according to the respective control signal; and controlling, by the second selector, the corresponding output terminal of the second selector to output the respective row initialization signal to the corresponding scan line connected to the second selector for time-sharing driving according to the respective control signal.

9. The driving method as recited in claim 7, wherein the control signal comprises a first level signal and a second level signal, wherein the operation of the selector controlling the corresponding output terminal of the selector to output the row initialization signal to the corresponding scan line for driving the corresponding scan line according to the control signal comprises:

selecting to output the first level signal or the second level signal by each of the first control signal, the second control signal, and the third control signal according to the row initialization signal to control the corresponding output terminal of the selector to output the row initialization signal to the corresponding scan line.

10. The driving method as recited in claim 1, wherein the plurality of selectors comprise a first selector and a second selector that are arranged at intervals, wherein the scan lines corresponding to the first selector are driven earlier than the scan lines corresponding to the second selector, wherein the control signal of the first selector is identical with the control signal of the second selector; wherein the operation of the selector controlling the corresponding output terminal of the selector to output the row initialization signal to the corresponding scan line for driving the corresponding scan line according to the control signal comprises:

obtaining grayscale voltages of any two scan lines respectively corresponding to the first selector and the second selector; in response to determining that the grayscale voltages of any two scan lines respectively corresponding to the first selector and the second selector when scanning are equal to each other, simultaneously turning on the two scan lines respectively corresponding to the first selector and the second selector.

11. The driving method as recited in claim 1, wherein the plurality of selectors comprises an eight-channel selector, wherein the operation of generating the row initialization signal configured to drive the at least four scan lines connected to each of the plurality of selectors and outputting the row initialization signal to the selector through the first pin of the driving chip comprises:

generating a row initialization signal operative to drive eight scan lines and outputting the row initialization signal to the eight-channel selector through the first pin of the driving chip;

wherein the row initialization signal is generated based on original scan signals of eight scan lines connected to the selector; wherein the row initialization signal comprises eight scan cycles, each scan cycle being configured to scan one respective scan line.

12. A display device, comprising a display panel and a driving module, the driving module comprising a driving chip and a plurality of selectors, the display panel comprising scan lines and data lines, the driving chip comprising a plurality of first pins, a plurality of second pins, and a plurality of third pins; wherein the plurality of first pins and the plurality of third pins are connected to the plurality of selectors, and wherein the plurality of second pins are connected to the data lines; wherein each of the plurality of selectors is connected to at least four scan lines, wherein each of the plurality of third pins is operative to output a respective control signal to the respective selector, wherein each of the plurality of first pins is operative to output a row initialization signal to the respective selector; wherein the display device is driven by the following driving method, comprising:

generating a row initialization signal configured to drive the at least four scan lines connected to each of the plurality of selectors and outputting the row initialization signal to the selector through the first pin of the driving chip; and controlling, by the selector, a corresponding output terminal of the selector to output the row initialization signal to the corresponding scan line for driving the corresponding scan line according to the respective control signal;

wherein the row initialization signal is generated based on original scan signals of the at least four scan lines connected to the selector, wherein the row initialization signal comprises at least four scan cycles, and each scan cycle being configured to scan one respective scan line;

the display device further comprising a delayer; wherein every two adjacent selectors in the plurality of selectors are put into a group; wherein of each group of selectors, the one with the scan lines driven earlier is a first selector, and the one with the scan lines driven later is a second selector; wherein the second selector is connected between the first selector and the third pin of the driving chip through the delayer.

13. The display device as recited in claim 12, wherein the display panel comprises a mini-LED screen; wherein the display panel further comprises a plurality of LED lights enclosed and driven by the scan lines and data lines; wherein the plurality of LED lights are arranged in a plurality of rows and a plurality of columns; wherein an anode of each LED light is connected to the respective scan line, and a cathode of the LED is connected to the respective data line; wherein the driving module comprises a printed circuit board, and wherein the driving chip and the plurality of selectors are arranged on the printed circuit board.

14. The display device as recited in claim 12, wherein the display panel is such divided that every four scan lines is taken as one section, and wherein the selector is a four-channel selector.

15. The display device as recited in claim 12, wherein the display panel is divided into a plurality of sections, wherein the plurality of sections comprises a section having four scan lines and a section having eight scan lines, and wherein the plurality of selectors comprise a four-channel selector and an eight-channel selector;

wherein the at least four-channel selector corresponds to the respective section having four scan lines, and the eight-channel selector corresponds to the respective section having eight scan lines.

16. The display device as recited in claim 12, wherein the first selector and the second selector are spaced apart, wherein the scan lines corresponding to the first selector are driven earlier than the scan lines corresponding to the second selector.

17. The display device as recited in claim 12, wherein there is disposed a delayer corresponding to each second selector, and wherein a number of the delayers is equal to a number of the second selectors.

18. The display device as recited in claim 12, wherein the operation of the selector controlling the corresponding output terminal of the selector to output the row initialization signal to the corresponding scan line for driving the corresponding scan line according to the control signal comprises:

obtaining grayscale voltage of pixels located in a same column corresponding to the at least four scan lines connected to a current selector;

arranging the grayscale voltages of the pixels in the same column in order; and determining whether the grayscale voltage corresponding to any one of the at least four scan lines represents a black image; in response to determining the grayscale voltage corresponding to any one of the at least four scan lines represents a black image, controlling the respective output terminal of the selector corresponding to the scan line to not output a signal so that the corresponding scan line is not driven; in response to determining that the grayscale voltage corresponding to each of the at least four scan lines does not represent a black image, controlling, by the selector, the corresponding output terminal of the selector to output the row initialization signal to the corresponding scan line for driving the corresponding scan line according to the respective control signal.

* * * * *